Dec. 31, 1957 T. H. DE SPAIN 2,818,205
HOSIERY INSPECTION AND HANDLING APPARATUS
Filed July 17, 1953 7 Sheets-Sheet 1
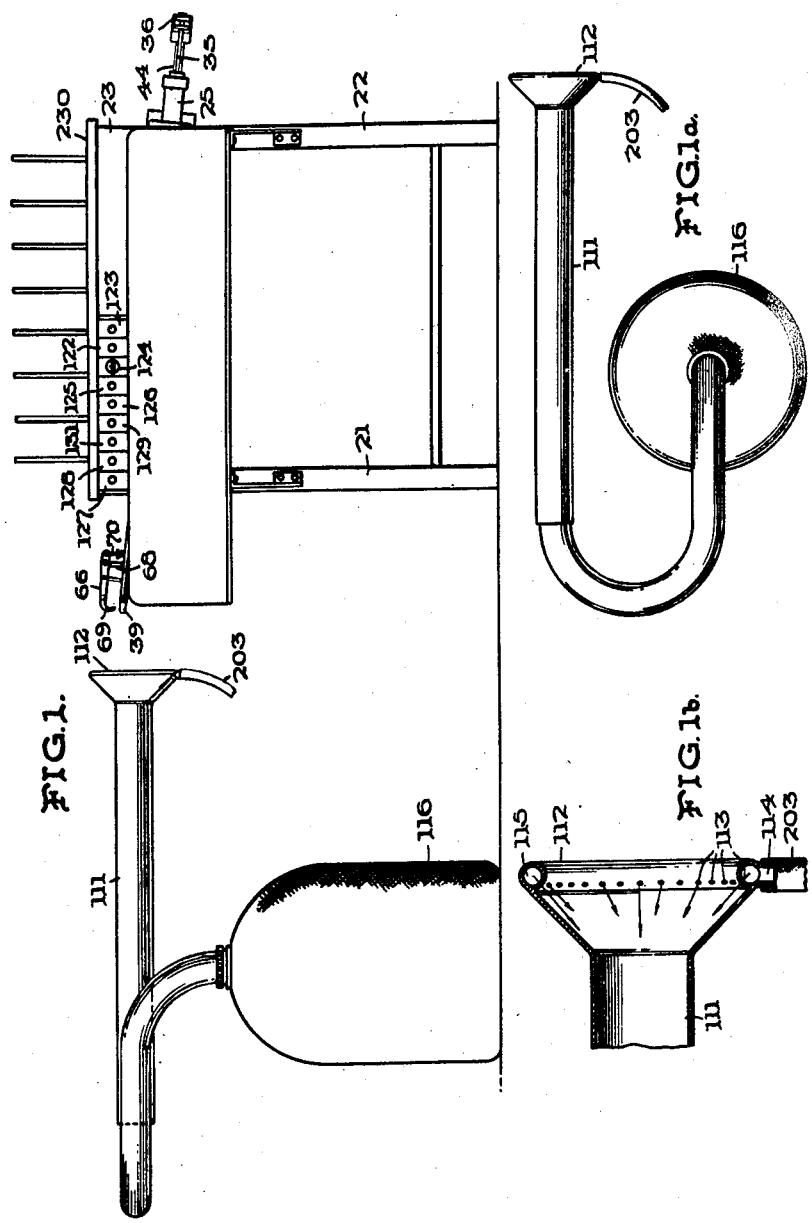
INVENTOR
Thomas H. De Spain
BY Church & Church
ATTORNEYS Dec. 31, 1957  T. H. DE SPAIN  2,818,205
HOSIERY INSPECTION AND HANDLING APPARATUS
Filed July 17, 1953  7 Sheets-Sheet 2
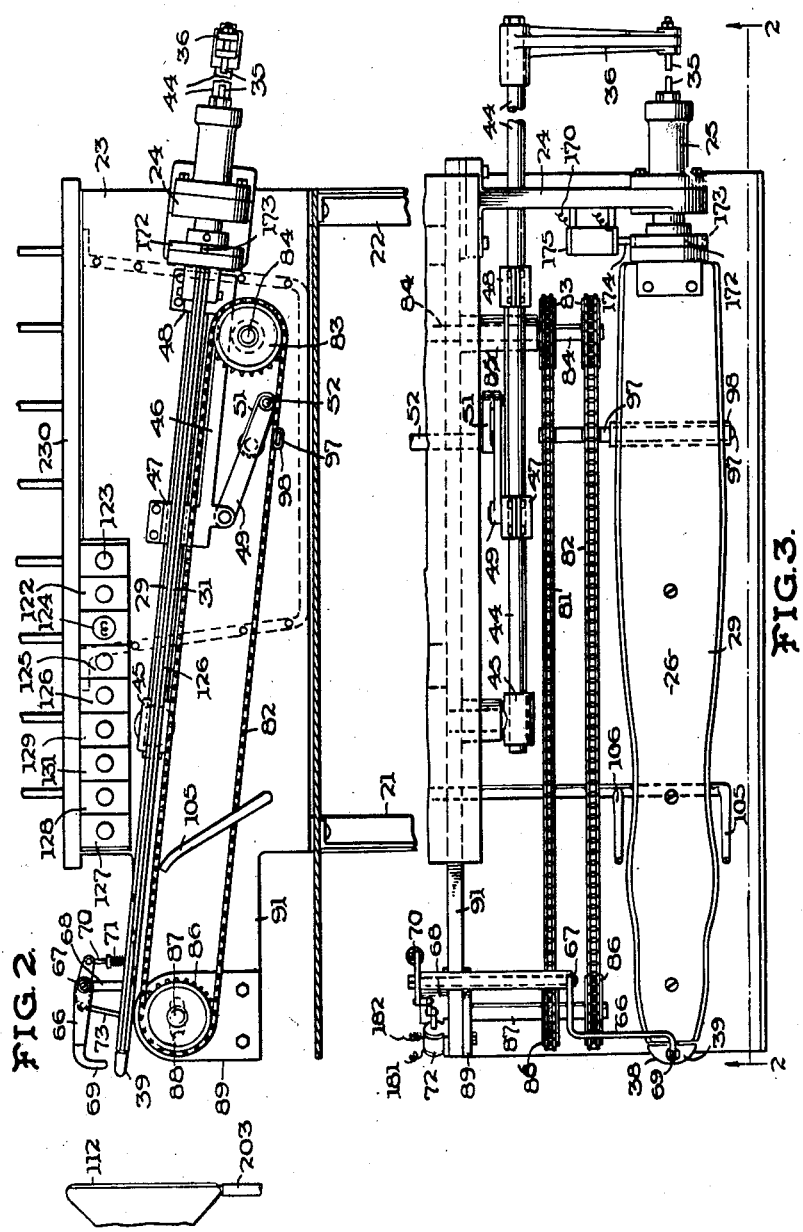
INVENTOR
Thomas H. DeSpain
BY Church & Church
ATTORNEYS Dec. 31, 1957 T. H. DE SPAIN 2,818,205
HOSIERY INSPECTION AND HANDLING APPARATUS
Filed July 17, 1953 7 Sheets-Sheet 3
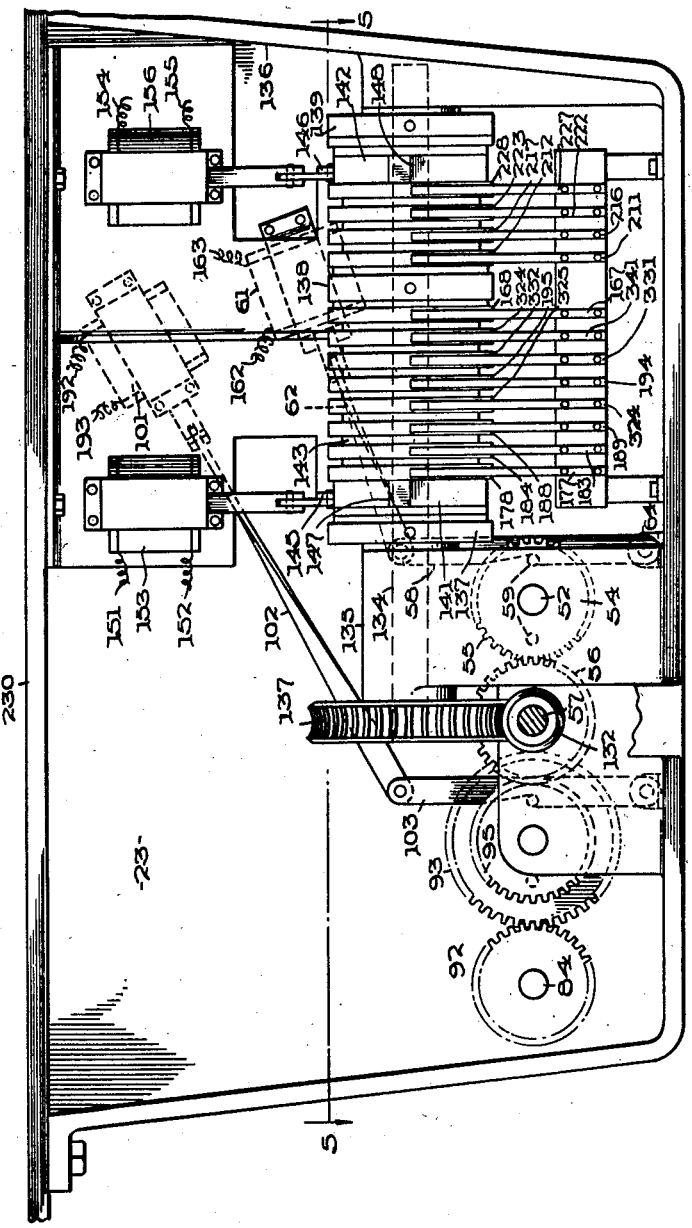
INVENTOR
Thomas H. DeSpain
BY Church & Church
ATTORNEYS Dec. 31, 1957  T. H. DE SPAIN  2,818,205
HOSIERY INSPECTION AND HANDLING APPARATUS
Filed July 17, 1953  7 Sheets-Sheet 4
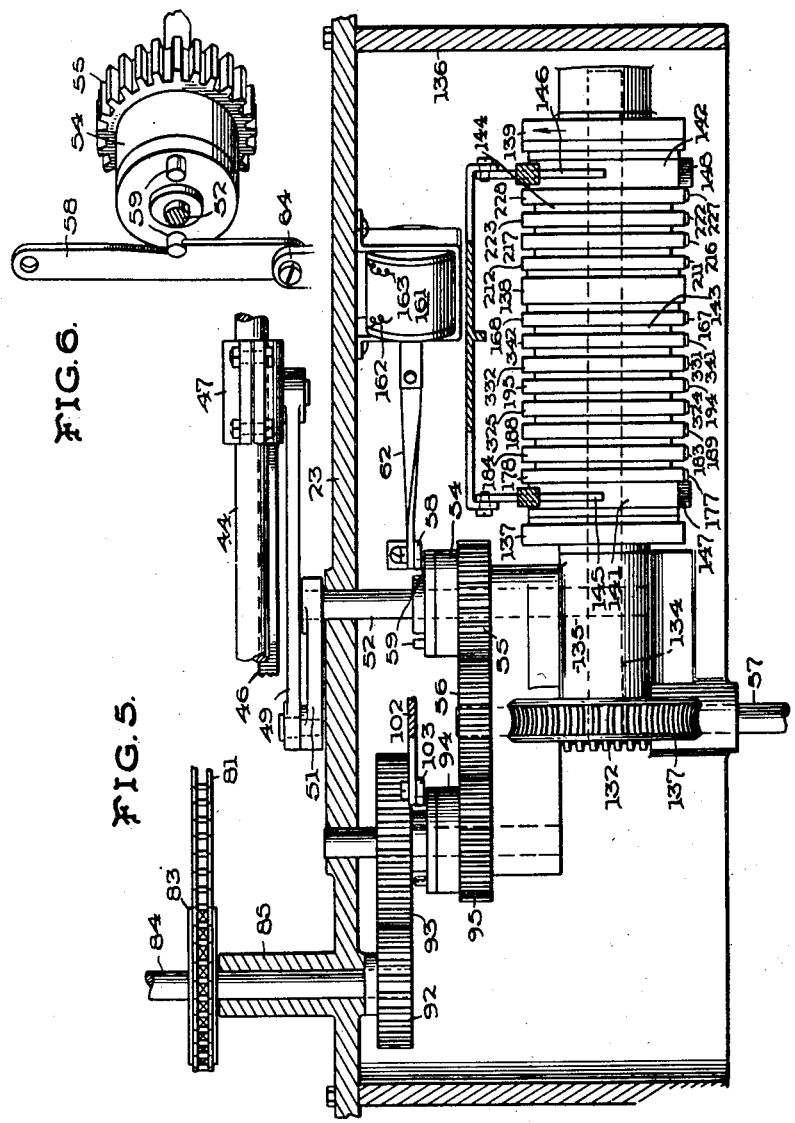
INVENTOR
Thomas H. DeSpain
BY Church & Church
ATTORNEYS Dec. 31, 1957 T. H. DE SPAIN 2,818,205
HOSIERY INSPECTION AND HANDLING APPARATUS
Filed July 17, 1953 7 Sheets-Sheet 5
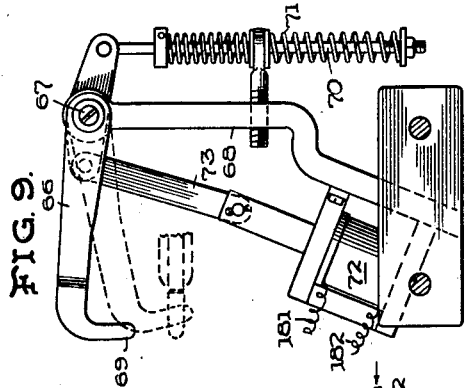
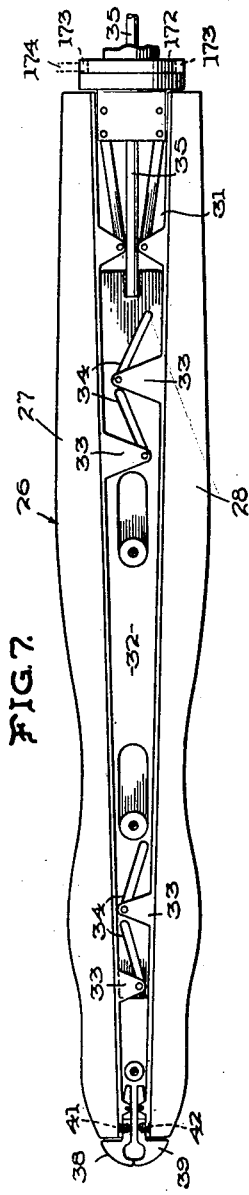
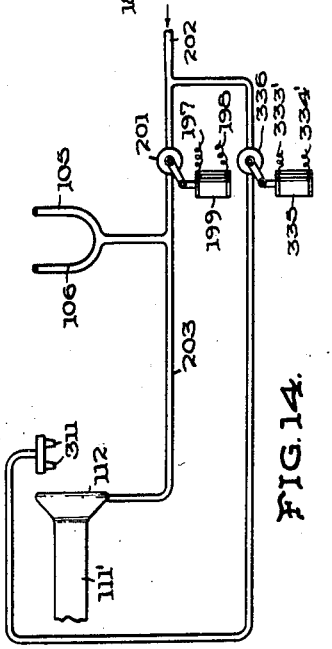
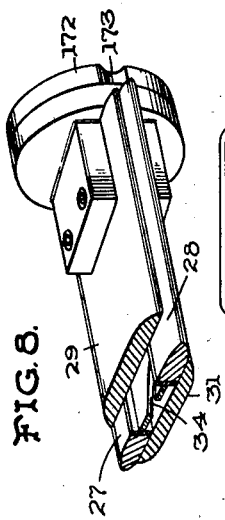
INVENTOR
Thomas H. DeSpain
BY Church & Church
ATTORNEYS Dec. 31, 1957 T. H. DE SPAIN 2,818,205
HOSIERY INSPECTION AND HANDLING APPARATUS
Filed July 17, 1953 7 Sheets-Sheet 6
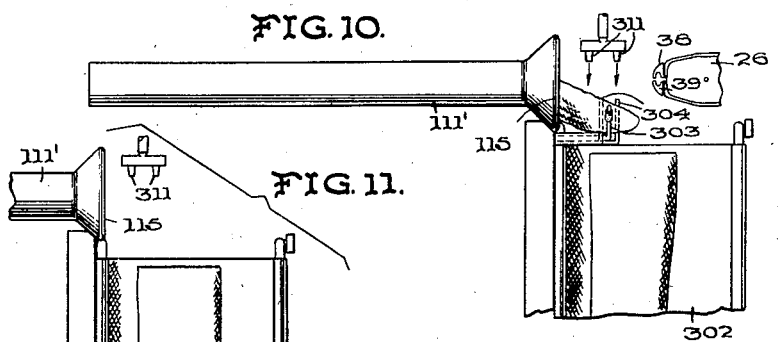
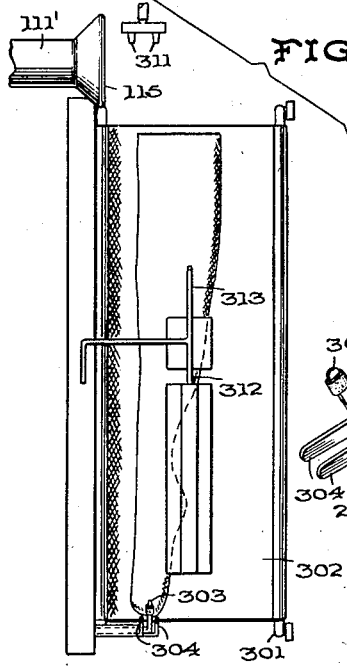
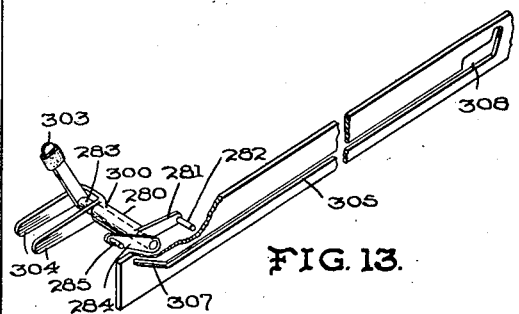
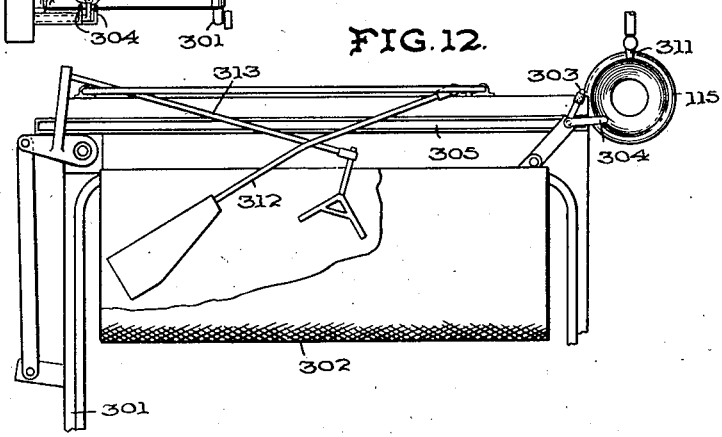
INVENTOR
Thomas H. DeSpain
BY Church & Church
ATTORNEYS Dec. 31, 1957 T. H. DE SPAIN 2,818,205
HOSIERY INSPECTION AND HANDLING APPARATUS
Filed July 17, 1953 7 Sheets-Sheet 7
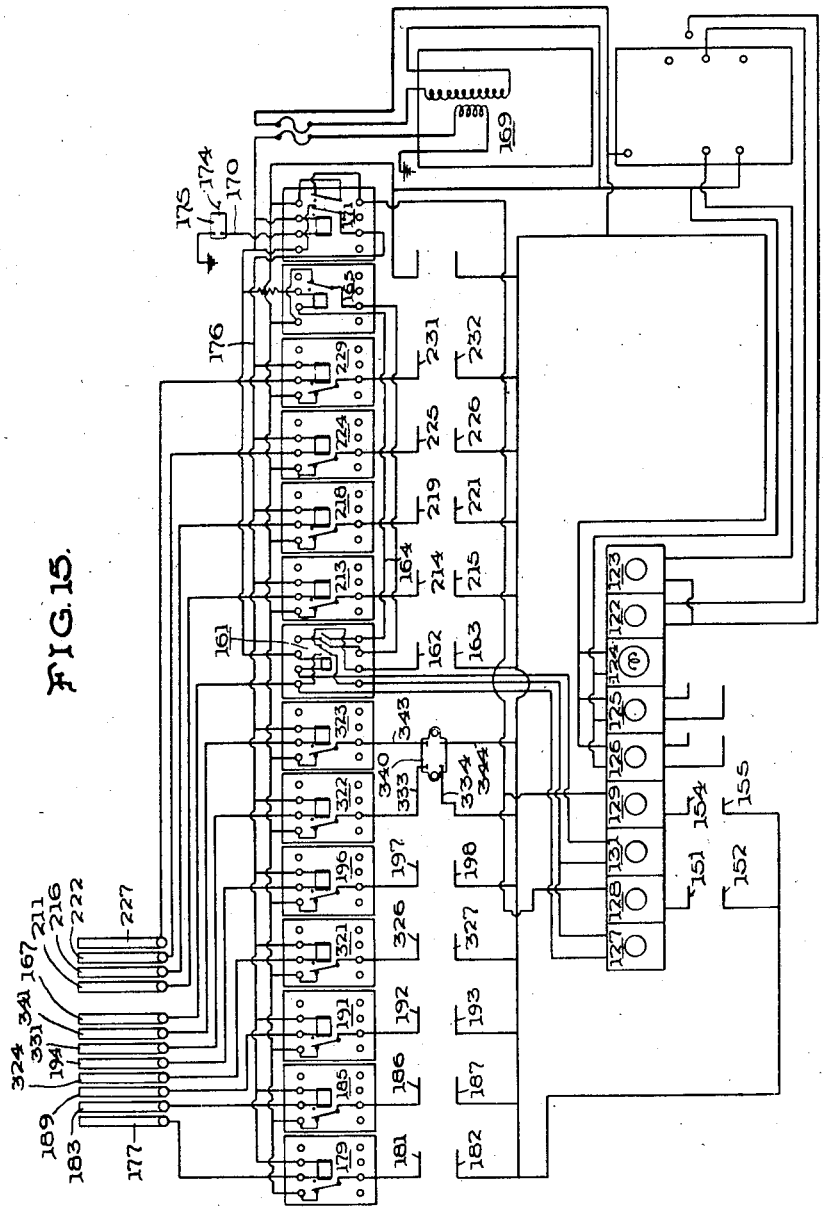
INVENTOR
Thomas H. DeSpain
BY Church & Church
ATTORNEYS United States Patent Office 2,818,205
Patented Dec. 31, 1957

2,818,205

HOSIERY INSPECTION AND HANDLING APPARATUS

Thomas H. De Spain, Paducah, Ky., assignor to Southern Textile Machinery Co., Incorporated, Paducah, Ky., a corporation of Kentucky Application July 17, 1953, Serial No. 368,625

22 Claims. (Cl. 223—43)

This invention relates generally to machines for inspecting hosiery and particularly concerns improvements in such machines for automatically stripping and turning the hosiery following the inspection operation.

Heretofore, in hosiery inspection, it has been the practice to manually apply the hosiery to an inspecting form which is rotatably mounted to turn about its own axis. This form is a flat form so the hosiery is first inspected on one side and then the form is turned about its axis to permit inspection of the hosiery on the other side. After the hosiery is manually applied to the form, the form is expanded, the hosiery is inspected on both sides, then the form is collapsed to permit manual removal of the hosiery from the form. The operator then deposits the removed or stripped hosiery in a receptacle and proceeds with the inspection of the next article. Inasmuch as the hosiery is inspected inside-out, and subsequent dyeing or boarding are effected with the hosiery rightside-out, it is now necessary to include an additional operation, following the inspection of manually turning the hosiery rightside-out.

While conventional hosiery inspection machines have not included any devices for stripping or turning the hosiery, hosiery turning aids have heretofore been developed. For example, a hosiery form, expansible and collapsible, has been provided with an arrangement to grip the toe of hosiery on the form. Then, with the toe gripped, the operator may manually remove or strip the hosiery from the form and simultaneously turn the hosiery inside-out. In still other devices, provision has been made for automatically stripping hosiery from a form by arranging one or more endless belts movable longitudinally of the form to engage the hosiery and strip it from the form or to move fingers along the form for that purpose. These belts do not normally effect any turning operation. Also, use of a vacuum to turn the hosiery has been suggested but has not been developed into practical apparatus.

An automatic machine for stripping hosiery from the inspection form, turning the hosiery rightside-out and delivering the hosiery to a receiver without any manual assistance from the operator is disclosed in copending application Serial No. 209,574, filed February 6, 1951 by Edward R. Ammon, now Patent No. 2,722,348, assigned to the same assignee as this application.

It is a major object of this invention to provide hosiery inspection and handling apparatus for automatically stripping hosiery from the inspection form and turning the hosiery, as is done in the device disclosed in said Ammon application, but which is easier to operate, requires less maintenance, and is more reliable in service.

Another object of the invention is to provide for the sequential operation of the machine from a central control which includes separate mechanisms operated according to whether or not the inspected hosiery is satisfactory whereby it is only necessary for the operator to depress a "good work" button or a "bad work" button in order to remove the hosiery from the form and place it with other satisfactory hosiery or provide for its manual removal from the machine.

Still another and more specific object of the invention is to provide an improved turning device whereby the toe of the hosiery on the form is positively inserted between toe gripping fingers which are closed upon collapse of the form.

In the attainment of these objects, one important feature of the invention resides in the provision of a central timing or control apparatus having "good work" and "bad work" control devices selectively operative by the operator to initiate different cycles of operation of the machine according to the condition of the hosiery on the inspection form. Another feature of the invention resides in the provision of a timing drum having "good work" and "bad work" parts for controlling the cyclic operation of the machine and the sequential operation of the parts.

A further feature of the invention resides in the arrangement of a toe inserting lever movable between the toe gripping fingers at one end of the form when the form is expanded to open the fingers whereby, upon collapse of the form, the fingers are closed upon the toe of the hosiery which is held between them by the lever, and the lever then subsequently being automatically retracted to permit operation of the form.

These and other objects and advantages and features of the invention will become apparent from the following specification taken in conjunction with the accompanying drawings, wherein:

Fig. 1 is a front elevation of the hosiery inspection and handling apparatus embodying the invention in its preferred form;

Fig. 1a is a top plan view of the hosiery receiving tube and bag shown in Fig. 1;

Fig. 1b is an enlarged sectional view of the opening of the hosiery receiving tube showing air jets for directing hosiery into the tube;

Fig. 2 is an enlarged front elevation showing the hosiery inspection form and stripping mechanism;

Fig. 3 is a top plan view of the apparatus shown in Fig. 2;

Fig. 4 is an enlarged sectional view of the operating and control mechanism as seen from the rear of the machine;

Fig. 5 is a horizontal sectional view taken along the line 5—5 of Fig. 4;

Fig. 6 is an enlarged perspective view showing details of one of the clutch mechanisms shown in Figs. 4 and 5;

Fig. 7 is a top plan view of the hosiery inspection form with the upper face plate removed showing the mechanism for expanding and collapsing the form;

Fig. 8 is an enlarged perspective view of part of the form showing some parts in section to illustrate the arrangement of the face plates and the expanding members of the form;

Fig. 9 is an enlarged detail view of the toe clamping mechanism shown in Figs. 1 and 2;

Fig. 10 is a partial plan view showing the cooperative arrangement of the form, the hosiery receiving tube and the stacking receptacle for the hosiery;

Fig. 11 is a similar view but showing in more detail the stacking and tamping device;

Fig. 12 is a side elevational view of the stacking and tamping mechanism;

Fig. 13 is an enlarged perspective detail view showing the hosiery stacking fingers and the track for controlling them;

Fig. 14 is a schematic diagram of the pneumatic circuit for controlling and supplying air to the air jets used in the machine; and Fig. 15 is a diagrammatic view of the electrical control circuit for controlling automatic sequential operations of the machine.

As shown in the drawings, the machine has a supporting framework including pedestals 21 and 22 supporting the inspection table which includes a main front casting 23 extending across the front of the inspection table and having thereon a bracket 24 carrying a bearing 25 rotatably supporting hosiery inspection form 26, the form 26 being supported for rotation about its own longitudinal axis.

This form 26 is of more or less conventional design, having side expanders 27 and 28 (Fig. 7), arranged between face plates 29 and 31. These side expanders 27 and 28 are arranged to be moved transversely of the face plates by longitudinal movement of slide 32, the side expanders being provided with projections 33, 33, carrying pins disposed in angularly-arranged slots 34, 34 in the slide 32. Slide 32 is actuated by a rod 35 extending through the rotatable support for the form and arranged to be operated by an arm 36 in a manner subsequently described. It will be apparent that movement of the slide 32 toward the toe end of the inspecting form projects the side expanders 27 and 28 laterally outwardly of the form to stretch the hosiery on the form so the hosiery is stretched across the flat face plates of the form and may easily be inspected. Following inspection on one side, the form is rotated about its own axis, manually, for inspection on the other side. In both inspection positions, the plane of the flat form is substantially horizontally disposed. When the inspection is completed, movement of rod 35 of the slide 32 away from the toe end of the form effects an opposite movement of the side expanders 27 and 28 withdrawing them laterally into the space between the face plates and thereby collapsing the form.

When the form is expanded, toe gripping fingers 38 and 39 at the end of the form are spaced apart. Upon collapse of the form, the toe gripping fingers 38 and 39 move together to grip the toe of the hosiery on the form. Toe gripping fingers 38 and 39 may be pivotally mounted on the side expanders and resiliently urged as by springs 41 and 42 toward their gripping position so they resiliently grip the toe end of the form and are not positively moved together by collapse of the form.

For the purpose of expanding and collapsing the form, arm 36 is connected to rod 44 slidable in guide 45 on panel 23. Rod 44 extends through bracket 24. Reciprocation of the rod 44 is effected by a drive member 46 coupled by sleeve couplings 47 and 48 to the rod 44. Drive member 46 is reciprocated by a link 49 connected to a crank 51 on the end of shaft 52 which is rotated one-half revolution each time the form is to be expanded or collapsed. Shaft 52 is rotated through clutch 54 from a gear 55 driven from drive gear 56 on the main drive shaft 57 of the machine. Clutch 54 is engaged to rotate shaft 52 upon release of clutch lever 58 from one of the pins 59, 59. Release of clutch lever 58 is effected by a solenoid 61 connected by a link 62 to the end of the clutch lever, the other end of which is pivoted as at 64. By energizing solenoid 61 and releasing clutch lever 58 from pin 59, then immediately deenergizing solenoid 61, the clutch lever 58 engages the other clutch pin 59 to disengage the clutch after it has turned the shaft 52 one-half revolution. This one-half revolution turns arm 51 one-half revolution which moves the drive rod 46 and the rod 44 a full stroke in one direction or the other. If the rod 44 is moved away from the toe end of the form, it operates the slide in the form to collapse the form, whereas if the rod 44 is moved toward the toe end of the form, it operates the slide to expand the form.

In order to insure that a stocking on the form has its toe placed between toe gripping fingers 38 and 39 so the toe of the hosiery will be gripped upon collapse of the form, a toe inserting lever 66 is pivoted at 67 on a bracket 68 extending upwardly near the toe end of the form. Toe lever 66 has a finger 69 arranged to move between the toe gripping fingers 38 and 39. Normally, the toe lever finger 69 is held spaced above the fingers 38 and 39 by a helical spring 71 arranged to act on a rod 70 connected to the end of the toe lever 66. Upon energization of solenoid 72, link 73 moves toe lever 66 downwardly to move finger 69 into the space between the toe gripping fingers 38 and 39. This forces the toe of the hosiery into position between the toe gripping fingers 38 and 39, so, upon collapse of the form the toe gripping fingers 38 and 39 firmly grip the toe of the hosiery to hold the toe while the hosiery is being stripped and turned in a manner to be described.

For the purpose of stripping hosiery from the form, a pair of endless chain belts 81 and 82 is carried by sprockets 83, 83 on shaft 84 extending through hub 85 on the panel 23, and sprockets 86, 86 on shaft 87 extending through slot 88 in plate 89 on arm 91 extending from the toe end of the machine frame. Shaft 84 is driven by a gear 92 which in turn is driven by gear 93 from a one-revolution type clutch 94, the driven element of which is rotated by a gear 95 driven from the gear 56 on the main drive shaft 57. Stripping bar 97 is mounted on the belts 81 and 82 and is provided with a smooth rubber cover 98 for engaging hosiery on the form 26. The upper course of the belts 81 and 82 extends parallel to and slightly beneath the lower face of the form 26 and the lower course of the chains 81, 82 is spaced considerably below the form 26. Upon rotation of the shaft 84 the sprockets 83, 83 drive the chains 81 and 82 to move the stripper 97 along the upper course of the chains toward the toe end of the form so the rubber cover 98 slides along the undersurface of the form 26 and strips hosiery from the collapsed form, the toe of the hosiery being gripped by the fingers 38 and 39 at the toe end of the form.

Drive shaft 57, being continuously driven operates through gears 56 and 95 to rotate the driving member of the clutch 94. Clutch 94 is rendered effective to turn gear 93 and thereby rotate the sprockets for the stripping chain to move the stripper longitudinally of the hosiery form upon energization of solenoid 101 which moves link 102 to operate clutch lever 103 and render clutch 94 operative. When this occurs, the hosiery stripper bar 97 is moved by the chains from its rest position spaced below the form, as shown in Fig. 2, toward the toe of the hosiery form to strip hosiery from the form. Solenoid 101 remains energized until the stripper bar passes around the sprockets 85 and 86 and returns to its rest position spaced below the hosiery form along the bottom course of the sprocket chains and adjacent the sprockets 83, 83. With the stripper bar in this rest position, spaced below the hosiery form 26, the hosiery form may be turned about its longitudinal axis without interfering or damaging the stripper bar. Of course, while the stripper bar is moving longitudinally of the form, the form remains in its horizontally-disposed position so the stripper bar engages the hosiery on the flat underside of the form. In a manner hereinafter to be described, operation of the stripper mechanism is prevented in the event the hosiery form is shifted from its horizontal position. Thus, a safety interlock is provided which renders the stripping mechanism operative only when the flat hosiery form 26 is in a substantially horizontal position. It is immaterial which flat side of the hosiery form is facing down, as the hosiery may be inspected and the hosiery may be stripped in either position.

As the stripper bar approaches the toe end of the form, stripping of the hosiery from the form is aided by air blasts from air jets 105 and 106 (Fig. 3) which are so arranged to direct the air blasts across the bottom surface of the form 26 toward the toe end of the form. As hereinafter described, the supply of air to the air jets 105 and 106 is controlled automatically in timed relation to operation of the stripper mechanism.

Longitudinally aligned with the hosiery inspecting form 26 and disposed at the toe end thereof is a hosiery receiving tube 111 which is of a length at least as great as the length of the hosiery, and has an enlarged mouth 112 into which the turned hosiery is forced by the air jets 105 and 106 as the hosiery is removed by the stripper mechanism from the form. Bearing in mind that the toe of the hosiery is gripped by the gripper fingers 38 and 39, the open end of the hosiery is forced into the mouth 112 of the hosiery receiving tube 111, where it is directed by air jets 113, 113 disposed around the periphery of the mouth 112 of the tube and directed inwardly of the tube to force the open end of the hosiery into the tube and thereby complete the turning of the hosiery.

Air for the jets 113, 113 is supplied through an air duct 114 to a manifold 115 surrounding the mouth 112 of the tube 111. After the hosiery has been completely turned through the action of the stripper mechanism, the effect of the air jets 105 and 106 directing the end of the hosiery into the tube and the force of air jets 113, 113 extending the hosiery to its entire length with the toe still gripped by the fingers 38 and 39, the hosiery form is automatically expanded and collapsed thereby releasing the grip of the fingers 38 and 39 and permitting the air blast from the jets 113, 113 to direct the hosiery through the length of receiving tube 111 into a bag 116. In this way, the hosiery is turned rightside-out and collected in bag 116 in which the hosiery may be transmitted to the next operation.

The entire control of the hosiery inspecting stripping and turning machine is effected from control panel 121 on the front of the machine. The series of push buttons may be easily operated by the operator of the machine to effect individual operations or institute an automatic cycle to transmit hosiery passed in inspection into the bag 116. This panel is duplicated in Fig. 15 which is a wiring diagram of the sequential control of the various operating mechanisms of the inspecting, stripping and turning machine. Thus, pushbutton 122 is arranged to institute starting of the motor for the machine and pushbutton 123 may be operated to stop the motor. When the motor is running, pilot light 124 is lighted. Pushbuttons 125 and 126 are arranged to control the elevation of the platform on which hosiery is positioned for application by the operator to the hosiery form. As this platform forms no part of the present invention, it has not been shown, but it is of conventional design used in hosiery inspecting apparatus heretofore developed which did not include the automatic stripping and turning features of the present invention. Elevation of the hosiery platform is adjusted according to the height of the pile of hosiery on that platform so the operator may most easily remove one stocking from the platform and apply it to the hosiery inspecting form. Pushbutton 127 is for operation by the operator to expand or collapse the form. Successive operations of the pushbutton alternately cause expansion and collapse of the form by causing energization of the solenoid 61 to operate the half revolution clutch and thereby change the hosiery inspecting form from expanded to collapsed position or from collapsed to expanded position. Initiation of a cycle to automatically strip, turn and transfer satisfactory hosiery to the receiving bag 116 is effected by pushbutton 128 and the cycle to automatically strip unsatisfactory hosiery is effected by pushbutton 129. Pushbutton 131 is for the purpose of resetting the mechanism at any point during the cycle.

Automatic sequential control of the various elements and mechanisms of the machine is effected from a central control mechanism continuously driven from a worm 132 on main drive shaft 57, which engages worm wheel 133 to rotate, continuously, control shaft 134 mounted in a bearing block 135 and journaled in end wall 136 of the main casting. Three friction discs 137, 138 and 139 are keyed to the continuously driven control shaft 134 and are operative through timing control discs 141 and 142 to selectively turn, for one revolution, good work timing control drum 143 or bad work timing control drum 144. Rotation of the respective control drums is prevented by engagement of detents 145 and 146 with abutments 147 and 148 on the control discs 141 and 142 respectively.

To initiate a stripping, turning and delivering cycle following the completion of a satisfactory inspection to deliver a good hose to the receiving bag, the operator pushes pushbutton 128 which is effective through wires 151 and 152 to energize solenoid 153 thereby withdrawing detent 145 from engagement with abutment 147 and permitting the friction disc 137 to rotate the good work timing control drum 143. Similarly, pressing of bad work pushbutton 129 is effective through leads 154 and 155 to energize solenoid 156 and thereby remove detent 146 from engagement with abutment 148 and permit friction disc 139 to turn bad work timing control drum 144.

Each of the timing drums 143 and 144 carries a series of control contact segments on which ride a plurality of brushes. Each of these will be described in conjunction with the respective operations which they control.

Proceeding with the normal operation, an operator places hosiery to be inspected on the collapsed form. The next step is to expand the form. This is accomplished by pressing both push buttons 127 and 131 energizing the coil of relay 161 thereby closing the power circuit through leads 162 and 163 to energize solenoid 61 and operate clutch lever 58 to render effective clutch 54 so it turns through a half revolution and rotates shaft 52 to operate arm 51 and link 49 and thereby reciprocate the rod 44 to shift slide 32 of the hosiery inspecting form and either expand or collapse the form. Operation of relay 161 is effective immediately to close the contacts for lead 164 and thereby energize relay 165 to open the circuit through lead 166 to the form control solenoid 61 so the clutch lever is immediately released to arrest operation of the clutch when it has completed one-half revolution. It will be observed that energization of relay 161 is effected by power supplied from brush 167 riding on control disc 168, which is arranged to be effective to operate the expansion and collapse of the form only when the timing drum 143 is in its rest position. The circuit is completed through the grounding of the segments on discs of the turning drum. This is a safety feature to prevent inadvertent operation of the expansion and collapse of the form during a cycle from automatically stripping and turning a satisfactory stocking from the form.

Power for all of the remaining relays is supplied from transformer 169 through normally closed contacts of relay 171, which is energized to open the contacts immediately that the inspection form is turned from its horizontal position. This is accomplished by the arrangement of a cam 172 having two notches 173 to operate arm 174 on limit switch 175 to close the limit switch immediately upon turning of the hosiery inspecting form from its horizontal position. When the limit switch is closed, it energizes solenoid 171 and by closing the ground connection through lead 170 thereby disconnects lead 176 from the power supply of transformer 169. With this safety interlock, none of the automatic mechanism can be operated during a period when the form is displaced from its horizontal position.

Assuming that the limit switch 175 is closed while the form is in its horizontal position, and the hosiery on the expanded form is satisfactory, the operator pushes good work pushbutton 128 to operate the solenoid 153 and permit rotation of timing drum 143. Immediately upon rotation of timing drum 143, contact brush 177 engages a contact segment on disc 178 to energize relay 179 and supply power through leads 181 and 182 to the toe lever solenoid 72, moving the toe lever 66 and the toe lever finger 69 into position between the expanded toe gripping fingers 38 and 39, and thereby forcing the toe of the hosiery on the form into position between the toe gripping fingers.

Immediately after operation of the toe lever, the hosiery form is collapsed upon engagement of contact brush 183 with a contact segment on disc 184 to energize relay 185 and thereby supply power through leads 186 and 187 to the leads 162 and 163 and energize form control solenoid 61, causing operation of the clutch lever 58 and permitting a half revolution of the clutch 54. The contact segment on disc 184 which is engaged by brush 183 is very short, so immediately after energization of the relay 185, the relay is deenergized so the clutch is rendered inoperative after it has completed a half revolution. In this way, the clutch operates through the form operating mechanism to shift the slide and retract the side expanders to collapse the form. Simultaneously, the collapse of the expanders causes the toe gripping fingers 38 and 39 to grip the inner surface of the toe of the stocking, which is held in position by the toe lever finger 69. After the form is collapsed so the gripping fingers grip the toe of hosiery on the form, contact brush 177 engages an insulating segment on disc 178, so relay 179 is deenergized and toe lever solenoid 72 withdraws the toe lever 66 away from the space between the toe gripping fingers.

With the gripper fingers gripping the toe of the stocking, continued rotation of the timing drum 143 brings a contact segment on disc 188 into contact with brush 189 to energize relay 191 and complete the circuit through leads 192 and 193 to energize stripping solenoid 101 and thereby operate clutch lever 103 to actuate clutch 94 and begin a stripping cycle. Brush 89 remains in contact with the segment on the disc 188 until the stripper chains have been driven sufficiently to move the stripper longitudinally of the form and push the hosiery toward the toe end of the form, then return along the lower course of the chains to the rest position adjacent the driving sprockets. At this point, the circuit through brush 189 is interrupted, the relay 185 opened, and the solenoid 101 deenergized to arrest movement of the chains. Inasmuch as the clutch 94 is of the one revolution type, upon release of the clutch lever 103, the clutch 94 is stopped in the same position at the termination of each cycle. Hence, the stripper is returned to its rest position, spaced below the hosiery form, permitting turning of the form to inspect hosiery thereon.

While the stripper is moving longitudinally toward the form, contact brush 194 engages a contact segment on disc 195 to energize relay 196, thereby close the circuits through leads 197 and 198 to air jet control solenoid 199 (Fig. 14), thereby energizing the solenoid and operating valve 201 to supply air from a source 202 through duct 203 to air jets 105 and 106 directing air blasts along the bottom face of the form toward the toe and also supplying air under pressure to manifold 115 to feed air through jets 113 directed inwardly from the mouth of the receiving tube.

With contact brush 194 still engaging the contact segment on the disc 195, brush 183 again engages a separate contact segment on disc 184 to energize relay 185 and supply power to energize form control solenoid 61 for the purpose of initiating another cycle of operation of clutch 54 to momentarily expand the form and release the fingers 38 and 39 from the stocking. Air jets 113 in the mouth of the receiving tube then force the stocking through the tube and into the receiving bag. Immediately, another contact is made by brush 183 with a contact segment on disc 184 to collapse the form so it is ready to receive more hosiery to be inspected. Finally, the timing drum completes one complete revolution, so detent 145 engages abutment 146 to arrest a movement of the timing drum with brush 167 in engagement with a contact segment on disc 168 and permit operation of the inspection form to expand and collapse through the operation of the pushbuttons as heretofore described.

In the event the hosiery placed on the form by the operator is unsatisfactory, the hosiery on the expanded form is stripped in a manner to be described upon the operator pushing pushbutton 129 to initiate a bad work cycle. Operation of pushbutton 129 is effective through leads 154 and 155 to energize bad work cycle control solenoid 156 and remove detent 146 from abutment 148, thereby initiating one cycle rotation of the bad work timing drum 144. Immediately, brush 211 engages a contact segment on disc 212 to energize relay 213 and supply power through leads 214 and 215 to leads 181 and 182 to energize toe lever solenoid 72 and move the toe lever to press the toe of the hosiery between the toe gripping fingers. While the toe finger is thus held, holding the toe between the toe gripping fingers, brush 216 engages a segment on disc 217 to energize relay 218 and supply power through leads 219 and 221 to the leads 186 and 187 for the purpose of energizing form control solenoid 61 and effect collapse of the form by operation of the clutch 54 in the manner heretofore described. Relay 218 is immediately deenergized by brush 216 being removed from a contact segment on the disc and, of course, the form control solenoid 61 is thereby immediately deenergized permitting the clutch to stop after one-half revolution with the hosiery form in collapsed position and the toe gripping fingers 38 and 39 gripping the end of the toe. At this point, the contact of brush 211 with a contact segment is terminated so relay 213 is deenergized and the toe lever solenoid is accordingly deenergized removing the toe finger by the operation of the spring 71.

With the form in collapsed position, brush 222 engages a contact segment on disc 223 to energize relay 224 and supply power through leads 225 and 226 to leads 192 and 193 energizing stripper control solenoid 101 and rendering clutch 94 effective to begin operation of the stripper chains and move the stripper bar 97 longitudinally along the underside of the hosiery form toward the toe end thereof to strip the hosiery from the collapsed form. Also, brush 227 engages a contact segment on disc 228 to energize relay 229 and supply power through leads 231 and 232 to lead 197 and 198, thereby energizing solenoid 199 and opening valve 201 to supply air under pressure to the air jets 105 and 106 as well as the manifold 115 for supplying the air under pressure to the air jets 113 in the mouth of the hosiery receiving tube.

When the hosiery has had time to be completely stripped from the form, the contact segment on disc 228 is disengaged from brush 227, deenergizing relay 229 to cut off the power to solenoid 199 and thereby close valve 201 to arrest the air blast. After the air has been cut off, contact brush 216 engages another contact segment on disc 217 to again energize relay 218 and its form control solenoid 61 to cause expansion of the form and release the toe of the stocking from the toe gripping fingers 38 and 39. The operator may then at any time remove the unsatisfactory stocking from the hosiery receiving tube because the toe of the stocking will be hanging out of the end of the tube. Of course, subsequently the brush 216 again engages a contact segment on disc 217 to cause collapse of the form so the operator may apply another stocking to be inspected at the conclusion of the cycle. Also, when the hosiery stripping bar has returned to its rest position, relay 224 is deenergized by movement of brush 222 onto an insulating segment of the disc 223 to arrest movement of the stripping bar.

As is apparent from the foregoing, the operator merely places the hosiery on the form and pushes a button to expand the form. Then, after inspecting both sides of the form, pushing of the good work pushbutton 128 or the bad work pushbutton 129 causes operation of an automatic cycle of the machine to either transfer satisfactory hosiery to the hosiery receiving bag or to leave unsatisfactory hosiery hanging out of the end of the receiving tube so they may be removed by the operator and placed with the unsatisfactory hosiery in a particular compartment or shelf 230 on the top of the machine.

In some installations, it is desirable to transfer the hosiery in longitudinally outstretched relation to a receiver with the hosiery tamped into a stack in the receiver. To accomplish this automatically as the hose is stripped and turned in the machine already described, an accessory is provided which may be easily connected to and operated in synchronism with the hosiery inspecting, stripping and turning machine.

This stacking attachment or accessory is illustrated in Figs. 10 to 13 and includes a frame 301 supporting a fabric hosiery receptacle 302 in which the hosiery is deposited in stacked relation and tamped into position in a manner to be described. Hosiery delivery fingers 303 and 304 are movable relative to each other to grip hosiery delivered to the receiving tube and are slidable longitudinally of the receptacle 302 in a guideway 305 in the top of the frame for the stacking device. At the ends of the guideway 305 are cam tracks 307 and 308 arranged to cause relative movement of the delivery fingers when they reach the ends of their travel along the guideway 305. Fingers 304, 304 are mounted on a sleeve 280 at the opposite end of which is an arm 281 carrying a stud 282 slidable in the guideway 305. Finger 303 is mounted on a shaft 283 extending through the sleeve 280 having at its opposite end an arm 284 provided with a stud 285 arranged to slide in the guideway 305. The arms 281 and 284 extend in opposite directions so, upon movement of stud 282 into engagement with cam track 308, fingers 304 are moved downwardly or counterclockwise as viewed in Fig. 13 to relieve the toe of hosiery gripped by the fingers. Likewise, upon movement of the fingers toward the hosiery form, stud 285 engages cam track 307 moving the finger 303 upwardly or clockwise as viewed in Fig. 13 to again open the fingers. Thus, when the fingers are at the ends of the track nearest the receiving tube and hosiery form, the cam track 307 causes relative movement of the fingers away from each other to an open position.

Immediately upon movement of the delivery fingers along the track toward the opposite end, movement from the cam track 307, causes studs 282 and 285 to close the fingers and grip the toe of hosiery disposed therein. The toe is thus gripped and pulled by the fingers throughout the length of the stacking device to the opposite end until the fingers engage cam track 308, at which point they are opened and the toe of the hosiery dropped into the stack in the receptacle 302. By pulling the toe longitudinally throughout the length of the stacking device, the stocking is arranged lengthwise in the receptacle 302 and drops on top of the hosiery previously deposited.

In using this stacking attachment, the hosiery is inspected in the usual fashion and stripped and turned and forced into the turning tube 111'. While the toe of the hosiery is still gripped by the fingers 38 and 39, air jets 105, 106 and 113 are cut off and air is supplied to air jets 311 tending to force the toe of the hosiery toward clamping fingers 303 and 304. Then, the form is expanded to release the toe gripping fingers 38 and 39. Air from jets 311 blows the toe of the hosiery into the toe delivery fingers 303 and 304. Then, the fingers move longitudinally along the guideway 305 to grip the toe and deposit the hosiery in the receptacle. Following return of the hosiery fingers to their normal position adjacent the delivery tube and the hosiery form, tampers 312 and 313 are operated to tamp the hosiery on top of the stack and thereby compact the stack in the receptacle 302. These tampers move up and down to press downwardly the toe end and the intermediate portion of hosiery in the receptacle 302.

In the event of use of the stacking attachment, relays 321, 322 and 323 are connected into the circuit and relay 196 is removed from the circuit of the wiring diagram. Then, upon initiation of a good work cycle, the relays 179, 185 and 191 are sequentially operated as heretofore described to position the toe clamp finger and collapse the form to grip the toe of the hosiery, then start the stripper bar moving by the chains along the underside of the hosiery form. As the stripper reaches the toe end portion of the form, brush 324 engages a contact segment on disc 325 to begin the operation of the air jets by energizing relay 321 which closes the circuit to energize solenoid 199 and open air valve 201, so air is supplied to the air jets 105 and 106 as well as the air jet 113 in the mouth of the hosiery receiving tube 111.

To accomplish this, power is supplied along leads 326 and 327 to the leads 197 and 198 connected to the solenoid 199. After the hosiery has been completely stripped, turned and transferred to the receiving tube by the air jets, and before the brush contact 183 actuates relay 185 to expand the form, the brush 324 moves onto an insulating segment, de-energizing relay 321, closing valve 201 and turning off the air to jets 105, 106 and 113. While the hosiery is thus disposed in the receiving tube 111 and gripped by the gripping fingers 38 and 39, contact brush 331 moves onto a contact segment of disc 332 to energize relay 322 which closes the contacts to the relay and supplies power along leads 333 and 334 through the coupling 340 for the stacking device accessory to leads 333' and 334' for solenoid 335 to energize the solenoid and open valve 336 to supply air from the source to the jets 311. This applies an air blast to the toe of the hosiery drawing it toward the delivery fingers and then, the brush 183 engages the contact segment on its disc to energize relay 185 and cause expansion of the form by operation of solenoid 61 to release the gripping fingers 38 and 39 from the toe of the hosiery. As the hosiery toe is released, it is blown by the blast from air jet 311 into the delivery fingers 303 and 304 and then contact brush 341 engages a contact segment on disc 342 to energize relay 323 which supplies power by leads 343 and 344 through the coupling 340 to the motor (not shown) for operating the delivery fingers and the tamping mechanism. Thus, the gripping fingers 303 and 304 are started to move away from the hosiery receiving tube and form whereby the cam track 307 causes the fingers to close onto the toe of the hosiery which is blown by the air jets 311 toward the delivery fingers. Then, the fingers continue to draw the hosiery out of the tube and deposit the hose lengthwise of the receptacle 302 upon engagement of stud 282 with cam track 308. Continued operation of the stacking device motor returns the fingers to a normal position adjacent the hosiery receiving tube and begins operation of the tamping devices 312 and 313 as heretofore described.

After the tamping devices have been operated, the brushes 331 and 341 engage insulating segments on the discs 332 and 342 so relays 322 and 323 are de-energized to cut off the air jets 311 and arrest operation of the delivering mechanism. Of course, the stripper returns to its rest position beneath the hosiery form as heretofore described and the entire apparatus is prepared for another cycle of operation.

For unsatisfactory work, the operator presses the button for bad work to initiate the same cycle of operation whether or not the delivering mechanism is used.

What is claimed in the invention is:

1. Hosiery inspection and handling apparatus comprising an expansible and collapsible form for receiving hosiery to be inspected, turnable about a longitudinal axis to permit viewing opposite sides of hosiery on the form; stripping means adjacent said form for stripping inspected hosiery from the form; delivery means at the end of said form for transferring stripped hosiery to a receiver; central control means for sequentially collapsing said form, operating said stripping means to strip hosiery from the form, and operating said delivery means to transfer the stripped hosiery to a receiver, manually operable means for initiating operation of said control means; and means actuated during rotation of said form between inspection positions for rendering said control means inoperative upon operation of said manually operable means.

2. Hosiery inspection and handling apparatus comprising an expansible and collapsible form for receiving hosiery to be inspected and having toe gripping fingers at one end thereof closed upon collapse of the form to grip the toe of the hosiery and opened upon expansion of the form to release the toe; stripping means for stripping inspected hosiery from the form including air jets arranged to direct air streams along the form to the toe end thereof to force the hosiery from the form turning the hosiery while the toe is gripped by said fingers; central control means for sequentially collapsing said form, operating said stripping means including said air jets to strip hosiery from the form, expanding said form to open said fingers and release the toe of the hosiery so the hosiery is forced by said air jets from said form, and discontinuing operation of said air jets and said stripping means; and manually operable means for initiating operation of said control means.

3. Hosiery inspection and handling apparatus comprising an expansible and collapsible form for receiving hosiery to be inspected and having toe gripping fingers at one end closed upon collapse of the form to grip the toe of hosiery on the form and opened upon expansion of the form to release the toe of the hosiery; stripping means for stripping inspected hosiery from the form including air jets arranged to direct air streams toward the toe of the form for removing hosiery from the form; a toe inserting lever adjacent said fingers operable to move between said fingers to project the toe of hosiery between said toe gripping fingers; central control means for sequentially projecting said toe inserting lever between said fingers, collapsing said form, retracting said finger, operating said stripping means including supply of air to said jets to strip hosiery from the form, expanding said form to open said fingers and release the toe therefrom to permit removal of the hosiery by said air jets, and discontinuing operation of said stripping means and the supply of air to said jets; and manually operable means for initiating operation of said control means.

4. Hosiery inspection and handling apparatus comprising an expansible and collapsible form for receiving hosiery to be inspected; stirpping means for stripping inspected hosiery from the form; delivery means for transferring stripped hosiery to a receiver; central control means including a good work control device and a bad work control device, said good work control device being operable to collapse said form, operate said stripping means, expand said form, and operate said delivery means, said bad work control device being operable to collapse said form, operate said stripping means, discontinuing operation of said stripping means without causing operation of said delivery means; and manually operable means for selectively operating one of said control devices according to the condition of the hosiery on the form.

5. Hosiery inspection and handling apparatus comprising an expansible and collapsible form for receiving hosiery to be inspected and turnable about a longitudinal axis to permit viewing of opposite sides of the hosiery on the form; stripping means for stripping inspected hosiery from the form; delivery means for transferring stripped hosiery to a container; central control means including a good work control device and a bad work control device, said good work control device being effective to sequentially collapse said form, operate said stripping means, expand said form, and operate said delivery means, and said bad work control device being operable to collapse said form, operate said stripping means, expand said form, and discontinue operation of said stripping means without operating said delivery means; a safety interlock device operated during rotation of said form between its inspection positions for rendering said control means inoperative; and manually operable means for initiating operation of said control means.

6. Hosiery inspection and handling apparatus comprising an expansible and collapsible form for receiving hosiery to be inspected and having toe gripping fingers at one end closed upon collapse of the form to grip the toe of hosiery on the form and opened upon expansion of the form to release the toe of the hosiery; means for stripping inspected hosiery from the form and turning the hosiery while the toe is gripped by said fingers; central control means including a good work control device and a bad work control device, said good work control device being effective for sequentially collapsing said form to close said fingers and grip the toe of hosiery on the form, operating said stripping means to remove hosiery from the form and turn the hosiery while the toe is gripped by said fingers, expanding said form to open said fingers and release the toe of the hosiery therefrom, and discontinue operation of said delivery means, said bad work control device being effective for sequentially collapsing said form to close said fingers for gripping the toe of the hosiery, operating said stripping means to remove the hosiery from the form, discontinuing operation of said stripping means, and expanding said form to open said fingers and release the toe of the hosiery; and manually operable means for selectively operating one of said control devices according to the condition of hosiery inspected on the form.

7. Hosiery inspection and handling apparatus comprising an expansible and collapsible form for receiving hosiery to be inspected, toe gripping fingers at one end of the form closed by collapse of the form for gripping the toe of hosiery on the form and opened upon expansion of the form to release the toe of the hosiery; a toe inserting lever movable to a position between said fingers for projecting the toe of the hosiery between said fingers; stripping means for stripping inspected hosiery from the form and turning the hosiery while the toe is gripped by the form; central control means including a good work control device and bad work control device, said good work control device being operative for sequentially projecting said toe inserting lever between said fingers, collapsing said form to close said fingers and grip the toe of the hosiery, retract said lever, operating said stripping means to remove inspected hosiery from the form and turn the hosiery while the toe is gripped by said fingers; expand said form to release said fingers from the toe of the hosiery, and discontinue operation of said stripping means after the hosiery is removed from the form, said bad work control device being effective for sequentially projecting said lever between said fingers to insert the toe of the hosiery therebetween, collapse the form to close said fingers on the toe of the hosiery, operate said stripping means to remove hosiery from the form, discontinue operation of said stripping means, and expand the form to open said fingers and release the hosiery gripped thereby; and manually operable means for selectively operating said control devices according to condition of hosiery inspected on the form.

8. Hosiery inspection and handling apparatus comprising an expansible and collapsible form for receiving hosiery to be inspected and having toe gripping finger at one end closed upon collapse of the form to grip the toe of hosiery on the form and opened upon expansion of the form to release the toe of the hosiery; a toe inserting lever movable between said fingers; stripping means for stripping inspected hosiery from the form and turning the hosiery while the toe is gripped by said fingers; air jets directing air along the form to aid the stripping of the hosiery and delivery the hosiery to a container; central control means including a good work control device and a bad work control device, said good work control device being effective for sequentially inserting said lever between said fingers, collapsing said form to close said fingers on the toe of the hosiery, retracting said lever, operating said stripping means and said air jets to strip the hosiery from the form, and turn the hosiery while the toe is gripped by said fingers, expanding the form to release the hosiery from said fingers and permit said air jets to transfer the hosiery to a receiver, and discontinue operation of said stripping means and said air jets, said bad work control device being effective for sequentially projecting said lever between said fingers, collapsing said form to close said fingers on the toe of the hosiery, retracting said lever, operating said stripping means and said air jets to remove the hosiery from the form, discontinuing operation of said stripping means and said air jets, and expanding said form to open said fingers and permit removal of the hosiery therefrom; and manually operable means for selectively initiating operation of said control devices according to the condition of work inspected on the form.

9. Hosiery inspection and handling apparatus comprising an expansible and collapsible form for receiving hosiery to be inspected and having toe gripping fingers at one end closed upon collapse of the form to grip the toe of hosiery on the form and opened upon expansion of the form to release the hosiery; stripping means for stripping inspected hosiery from the form; air jets for aiding the stripping of the hosiery from the form and for transferring hosiery to a receiver; central control means including a good work control device and a bad work control device, said good work control device being effective for sequentially collapsing said form to close said fingers on the toe of hosiery on the form, operating said stripping means and said air jets to remove hosiery from the form and turn hosiery while the toe is gripped by said fingers, expanding said form to open said fingers and permit removal of the hosiery and transfer to a receiver by said air jets, and discontinuing operation of said stripping means and said air jets, said bad work control device being effective for sequentially collapsing said form to close said fingers on the toe of hosiery on the form, operating said stripping means and said air jets, discontinuing operation of said stripping means and said air jets, and expanding said form to release said fingers and permit removal of the hosiery; and manually operable means for selectively initiating operation of said control devices according to the condition of work inspected on the form.

10. Hosiery inspection and handling apparatus comprising an expansible and collapsible form for receiving hosiery to be inspected; stripping means for stripping inspected hosiery from the form; delivery means for transferring stripped hosiery to a receiver; central control means including a good work control device and a bad work control device, said good work control device being effective for sequentially collapsing said form, operating said stripping means, operating said delivery means, and expanding said form, said bad work control device being effective for sequentially collapsing said form, operating said stripping means and expanding the form without operating said delivery means to transfer the hosiery to a receiver; and manually operable means for selectively initiating operation of said control devices according to the condition of hosiery inspected on the form.

11. Hosiery handling apparatus comprising a form on which hosiery may be placed, toe gripping fingers at the end of said form for gripping the toe of hosiery on the form, a toe inserting lever adjacent said fingers operable when said fingers are opened to project the toe of the hosiery between said fingers, and means for stripping hosiery from the form to turn the hosiery while the toe is gripped by said fingers.

12. Hosiery handling apparatus comprising a form upon which hosiery may be placed, toe gripping fingers at the end of said form, means for opening and closing said fingers to grip the toe of hosiery on said form, a toe inserting lever adjacent said fingers operable when said fingers are expanded to project the toe of hosiery between said fingers, and means for stripping hosiery from the form to turn the hosiery while the toe is gripped by said fingers.

13. Hosiery handling apparatus comprising a form upon which hosiery may be placed, toe gripping fingers at the end of said form, means for opening and closing said fingers to grip the toe of hosiery on said form, a toe inserting lever adjacent said fingers, means operable when said fingers are opened to shift said lever between said fingers and project the toe of the hosiery between said fingers, and means for stripping hosiery from the form to turn the hosiery while the toe is gripped by said fingers.

14. Hosiery handling apparatus comprising a form upon which hosiery may be placed, toe gripping fingers at the end of said form, finger operating mechanism for opening and closing said fingers, a toe inserting lever adjacent said fingers, lever operating mechanism for shifting said lever between said fingers, means for stripping hosiery from the form, and sequential operation control means for successively operating said finger operating mechanism to open said fingers, actuating said lever operating mechanism to move said lever between said fingers and project the toe of hosiery between said fingers, operating said finger operating mechanism to close said fingers, actuating said lever operating mechanism to retract said lever, and operating said stripping means to strip the hosiery from the form and turn the hosiery while the toe is gripped by said fingers.

15. Hosiery inspection and handling apparatus comprising an expansible hosiery form, toe gripping fingers operated by collapse and expansion of the form to grip and release the toe of hosiery on the form, and a toe inserting lever adjacent said fingers operated when said form and fingers are expanded to project the toe of hosiery between said fingers.

16. Hosiery inspection and handling apparatus comprising an expansible hosiery form, toe gripping fingers operated by collapse and expansion of said form to grip and release the toe of hosiery on the form, a toe inserting lever adjacent said fingers operated when said form and fingers are expanded to project the toe of hosiery between said fingers, and stripping means for stripping hosiery from the form to turn the hosiery while the toe is gripped by said fingers.

17. Hosiery inspection and handling apparatus comprising an expansible hosiery form, toe gripping fingers operated by collapse and expansion of the form to grip and release the toe of hosiery on the form, a toe inserting lever adjacent said fingers, and mechanism operated when said form and fingers are expanded to shift said lever between said fingers and thereby project the toe of hosiery between said fingers.

18. Hosiery inspection and handling apparatus comprising an expansible form, toe gripping fingers operated by collapse and expansion of the form to grip and release the toe of hosiery on the form, a toe inserting lever adjacent said fingers, mechanism for shifting said lever between said fingers to project the toe of hosiery on said form between said fingers, and sequential control means for operating the form to expand the form and then operate said toe lever inserting mechanism to move said lever between said fingers, collapse the form to close said fingers on the hosiery therebetween, and retract said lever.

19. Hosiery inspection and handling apparatus comprising an expansible hosiery form, toe gripping fingers operated by collapse and expansion of the form to grip and release the toe of hosiery on the form, a toe inserting lever adjacent said fingers, mechanism for shifting said toe inserting lever between said fingers to project the toe of hosiery between said fingers and then retract said lever, means for stripping hosiery from the form to turn the hosiery while the toe thereof is gripped by said fingers, and sequential control mechanism for sequentially causing expansion of the form, movement of the lever between said fingers, collapse of the form, retraction of said lever, and operation of said stripping mechanism.

20. Hosiery inspection and handling apparatus comprising an expansible and collapsible form for receiving hosiery to be inspected, stripping means adjacent the form for stripping inspected hosiery from the form; delivery means at the toe end of the form for transferring stripped hosiery to a receiver; a timing drum for sequentially collapsing said form, operating said stripping means to strip hosiery from the form, and operating said delivery means to transfer hosiery to the receiver; and manually operable means for initiating rotation of said timing drum, rotation of said timing drum being arrested after the drum has rotated through a predetermined angle.

21. Hosiery handling apparatus comprising a form on which hosiery may be placed, means for stripping hosiery from the form, toe gripping fingers at the toe end of the form for gripping the toe of the hosiery as it is stripped from the form, and a toe inserting lever at the toe end of the form for inserting the toe of the hosiery between said fingers.

22. Hosiery handling apparatus comprising a form on which hosiery may be placed, means adjacent the form for stripping hosiery from the form and turning the hosiery as it is stripped, fingers adjacent the toe end of the form for gripping the toe of hosiery as it is stripped from the form and turned, a toe inserting lever at the toe end of the form for inserting the toe of the hosiery between said fingers, and means for sequentially operating said lever, closing said fingers, and operating said stripping means to strip hosiery from the form while the toe is gripped by said fingers.

References Cited in the file of this patent

UNITED STATES PATENTS

| | | |
|---|---|---|
| 775,975 | Iverson | Nov. 29, 1904 |
| 1,793,856 | Johnson | Feb. 24, 1931 |
| 2,454,622 | Ammon | Nov. 23, 1948 |
| 2,722,348 | Ammon | Nov. 1, 1955 |
| 2,760,696 | Shoaf | Aug. 28, 1956 |
| 2,760,697 | Shoaf | Aug. 28, 1956 |